US009728281B2

(12) United States Patent
Koestner

(10) Patent No.: US 9,728,281 B2
(45) Date of Patent: Aug. 8, 2017

(54) AUXILIARY CONDENSER SYSTEM FOR DECAY HEAT REMOVAL IN A NUCLEAR REACTOR

(71) Applicant: Babcock & Wilcox mPower, Inc., Charlotte, NC (US)

(72) Inventor: John J Koestner, Lynchburg, VA (US)

(73) Assignee: BWXT MPOWER, INC., Charlotte, NC (US)

(*) Notice: Subject to any disclaimer, the term of this patent is extended or adjusted under 35 U.S.C. 154(b) by 944 days.

(21) Appl. No.: 13/766,693

(22) Filed: Feb. 13, 2013

(65) Prior Publication Data

US 2013/0272473 A1 Oct. 17, 2013

Related U.S. Application Data

(60) Provisional application No. 61/625,174, filed on Apr. 17, 2012.

(51) Int. Cl.
*G21C 9/00* (2006.01)
*G21C 15/18* (2006.01)
(Continued)

(52) U.S. Cl.
CPC .......... *G21C 15/18* (2013.01); *G21C 15/182* (2013.01); *G21D 3/06* (2013.01); *G21C 1/32* (2013.01); *G21D 1/02* (2013.01); *Y02E 30/40* (2013.01)

(58) Field of Classification Search
CPC .......... G21C 1/32; G21C 1/322; G21C 1/324; G21C 1/326; G21C 15/00; G21C 15/18;
(Continued)

(56) References Cited

U.S. PATENT DOCUMENTS 3,702,281 A * 11/1972 Birts et al. ............. G21C 15/18
376/282
4,897,240 A 1/1990 Sako
(Continued)

FOREIGN PATENT DOCUMENTS

CN 1050460 A 4/1991
CN 101999149 B 6/2013
(Continued)

OTHER PUBLICATIONS

International Search Report and Written Opinion for PCT/US2013/027837 dated Oct. 29, 2013.
(Continued)

*Primary Examiner* — Marshall O'Connor
(74) *Attorney, Agent, or Firm* — Nelson Mullins Riley & Scarborough, LLP

(57) ABSTRACT

A nuclear reactor includes an internal steam generator and a nuclear core disposed in a containment structure. A condenser is disposed outside the containment structure, and includes a condenser inlet line tapping off a steam line connected to the steam generator outside the containment structure, and a condensate injection line conveying condensate from the condenser to the integral steam generator. Isolation valves are located outside the containment structure on a feedwater line, the steam line, and the condensate injection line. The valves have an operating configuration in which the isolation valves on the feedwater and steam lines are open and the isolation valve on the condensate injection line is closed, and a heat removal configuration in which the isolation valves on the feedwater and steam lines are closed and the isolation valve on the condensate injection line is open.

10 Claims, 5 Drawing Sheets

(51) Int. Cl.
*G21D 3/06* (2006.01)
*G21C 1/32* (2006.01)
*G21D 1/02* (2006.01)

(58) Field of Classification Search
CPC ... G21C 15/182; G21C 15/185; G21C 15/187
See application file for complete search history.

(56) References Cited

U.S. PATENT DOCUMENTS

| | | |
|---|---|---|
| 5,000,907 A | 3/1991 | Chevereau et al. |
| 5,011,652 A | 4/1991 | Tominaga et al. |
| 5,043,135 A | 8/1991 | Hunsbedt et al. |
| 5,045,274 A | 9/1991 | Donaldson |
| 5,075,070 A | 12/1991 | Costes |
| 5,087,408 A | 2/1992 | Tominaga et al. |
| 5,102,616 A | 4/1992 | Gardner et al. |
| 5,145,639 A | 9/1992 | Hui |
| 5,169,595 A | 12/1992 | Cooke |
| 5,276,720 A | 1/1994 | Oosterkamp et al. |
| 5,301,216 A | 4/1994 | Klapdor et al. |
| 5,406,602 A | 4/1995 | Hunsbedt et al. |
| 5,499,277 A | 3/1996 | Hunsbedt |
| 5,517,538 A | 5/1996 | Seidelberger et al. |
| 5,887,043 A | 3/1999 | Spinks |
| 6,249,561 B1 | 6/2001 | Aburomia |
| 6,519,308 B1 | 2/2003 | Boardman |
| 6,618,461 B2 | 9/2003 | Cheung et al. |
| 6,718,001 B2 | 4/2004 | Hidaka et al. |
| 6,795,518 B1 | 9/2004 | Conway et al. |
| 7,308,070 B2 | 12/2007 | Sim et al. |
| 8,170,173 B2 | 5/2012 | Reyes, Jr. et al. |
| 2009/0034675 A1 | 2/2009 | Hamasaki et al. |
| 2009/0129530 A1* | 5/2009 | Reyes, Jr. ............... G21C 1/32 376/282 |
| 2011/0146307 A1* | 6/2011 | Ofer ...................... F01K 23/101 62/89 |

FOREIGN PATENT DOCUMENTS

| | | |
|---|---|---|
| JP | S6120835 A | 1/1986 |
| JP | H03269297 A | 11/1991 |
| JP | 2003043176 A | 2/2003 |

OTHER PUBLICATIONS

Partial European Search Report dated Nov. 16, 2015 for EP Application No. 13794435.1.
Extended European Search Report dated Mar. 22, 2016 for EP Application No. 13794435.1.
Office Action dated Apr. 13, 2016 for Chinese Application No. 201380031778.2.

* cited by examiner

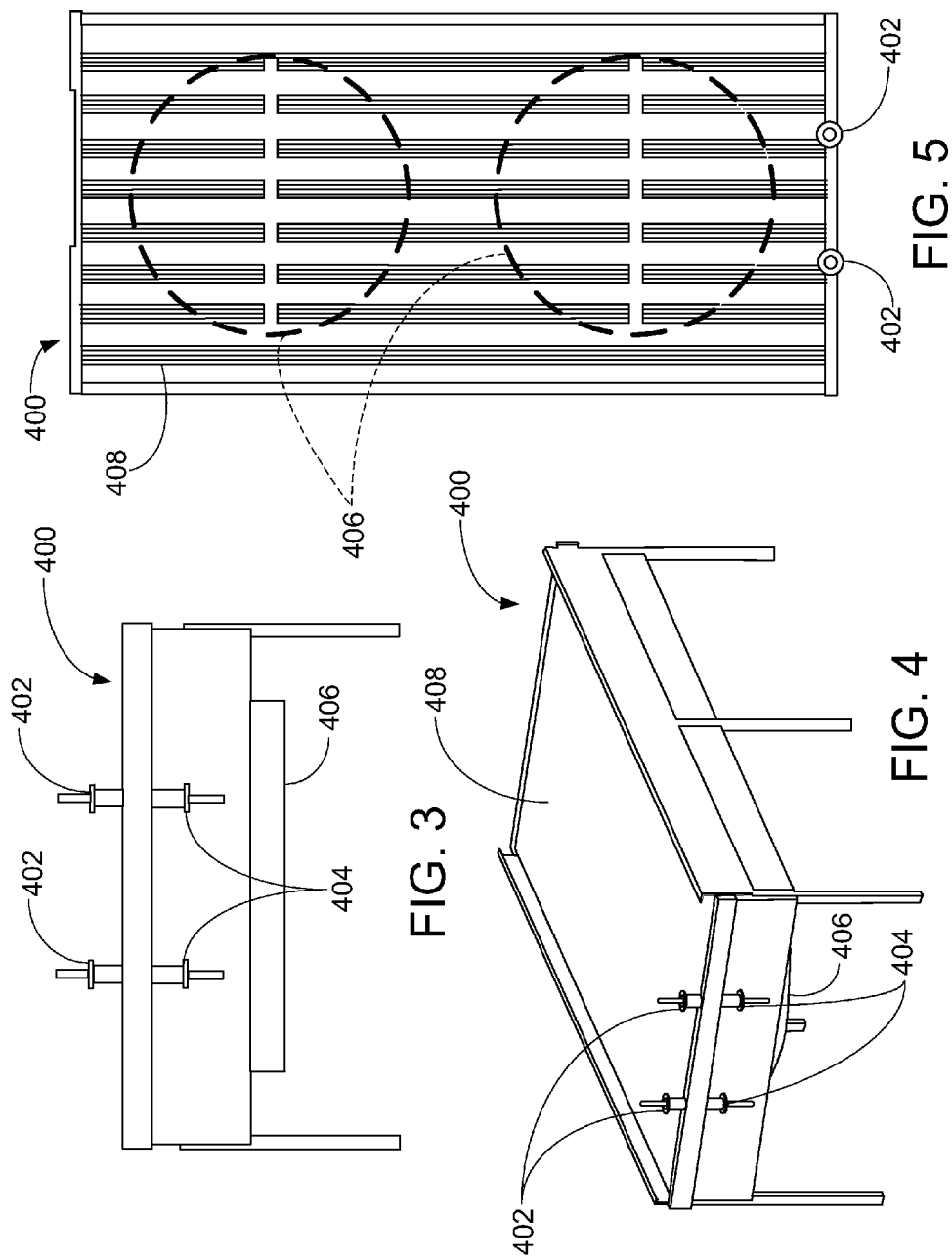

AUXILIARY CONDENSER SYSTEM FOR DECAY HEAT REMOVAL IN A NUCLEAR REACTOR

This application claims priority to U.S. Provisional Application Ser. No. 61/625,174 filed on Apr. 17, 2012, entitled AUXILIARY CONDENSER SYSTEM FOR DECAY HEAT REMOVAL IN A NUCLEAR REACTOR SYSTEM, the entirety of which is incorporated by reference herein.

BACKGROUND

The following relates to the nuclear reactor arts, nuclear reactor operating arts, nuclear power generation arts, nuclear reactor safety arts, and related arts.

In a pressurized water type reactor (PWR), a nuclear reactor core comprising fissile material, e.g. $^{235}U$, is disposed within a pressure vessel and immersed in primary coolant, usually water. The primary coolant flows upwardly through the reactor core and is heated by the radioactive core. The primary coolant flows through a steam generator where it heats secondary coolant water to convert the secondary coolant to steam, which is used to perform useful work such as driving a turbine in the case of a nuclear power plant. An advantage of PWR designs over some other system such as boiling water reactor (BWR) systems is that the secondary coolant does not come into contact with the nuclear reactor core. Conventionally, the steam generator is separate from the PWR and a primary coolant circuit conducts primary coolant between the PWR pressure vessel and the external steam generator. This primary coolant circuit introduces large-diameter piping and hence is a potential location for a loss of coolant accident (LOCA). In some PWR designs, the steam generator is disposed inside the pressure vessel (sometimes referred to as an "integral PWR"). An example of a deployed integral PWR is the Consolidated Nuclear Steam Generator (CNSG) system developed by Babcock & Wilcox and employed in the German nuclear-powered ship N. S. Otto Hahn which was in commercial service between 1970 and 1978.

A loss of coolant accident, i.e. LOCA, occurs when there is a substantial interruption of the primary coolant circuit, typically through a pipe break at a vessel penetration into or out of the nuclear reactor pressure vessel. Besides a LOCA, a nuclear power plant can experience other types of abnormal operating events, such as a station blackout or a loss of feedwater event. A station blackout occurs when external power to the nuclear island is interrupted. Although a nuclear power plant generates electricity, it normally relies upon the local power grid for electrical power to operate equipment such as pumps, cold water circulation systems, and so forth. A loss of feedwater event occurs when the secondary coolant flow is interrupted, either through a pipe break or through an event, such as a turbine trip, that causes safety valves to interrupt the secondary coolant circulation. As reactor heat sinking is provided by heat transfer from primary coolant to secondary coolant in the steam generator, a loss of feedwater event is effectively a loss of heat sinking event.

The safety systems of a nuclear power plant are extensive, and include (in addition to the pressure vessel of the nuclear reactor) a containment structure surrounding the nuclear reactor, typically made of concrete, steel, or steel-reinforced concrete, and an emergency core cooling system (ECC) that is designed to depressurize the pressure vessel and containment structure, and to transfer heat from inside containment to an ultimate heat sink (UHS) comprising a body of water located outside of containment. In a typical ECC response, any overpressure inside the reactor pressure vessel is vented into the containment structure, borated water under high pressure is injected into the pressure vessel, water is poured down the exterior of the pressure vessel and drains into a flood well at the bottom of the containment structure, and condenser systems condense the steam and reject the latent heat to the UHS pool. The borated water serves as a neutron poison and, together with scram of the shutdown rods, quickly extinguishes the nuclear chain reaction. However, residual decay heat from short half-life intermediate products of the nuclear chain reaction continue to generate decay heat in the reactor core, and the heat output of the core decays exponentially. This decay heat is initially expelled to the UHS pool by the ECC condensers; after depressurization, low pressure heat exchangers take over to continue to reject decay heat to the UHS pool.

In a LOCA, primary coolant in the subcooled state flashes to steam and escapes into containment where it is condensed by the ECC condensers. In a station blackout or loss of heat sinking event, temperature and pressure may rise inside the pressure vessel due to interruption of primary coolant circulation (e.g., due to shutdown of the reactor coolant pumps in a station blackout) and/or due to interruption of the heat sinking (in the case of a loss of feedwater event), and if the pressure in the pressure vessel becomes too high then relief valves vent excess steam to containment (e.g., into a refueling water storage tank, RWST, located inside containment) and the ECC condensers accommodate any pressure rise inside the containment structure.

All these are abnormal events, and require extensive post-event actions, e.g. removal of radioactive primary coolant water from the containment structure, filtering of the (remaining) primary coolant water inside the pressure vessel to remove excess soluble boron compounds, regeneration or replacement of ECC condensers or other ECC components, replacement of purified water in the RWST, replenishment of the UHS pool, and so forth, before the nuclear reactor can be restarted and put back into service. Additionally, any event in which primary coolant water escapes into the containment structure (even via a designed pressure relief valve) is an event in which radioactive primary coolant has reached the "secondary" containment level provided by the containment structure.

SUMMARY

In one embodiment, a system comprises: a nuclear reactor disposed in a containment structure, the nuclear reactor including an internal steam generator and a nuclear core immersed in primary coolant water, the nuclear core comprising fissile material; a steam line connected to an outlet of the steam generator and passing through the containment structure to convey steam from the internal steam generator; a feedwater line connected to an inlet of the steam generator and passing through the containment structure to convey feedwater into the internal steam generator; a condenser disposed outside the containment structure; a condenser inlet line tapping off the steam line at a point outside the containment structure and feeding into an inlet of the condenser; and a condensate injection line conveying condensate from an outlet of the condenser into the steam generator.

In another embodiment, a system comprises: a nuclear reactor disposed in a containment structure, the nuclear reactor including an internal steam generator and a nuclear core immersed in primary coolant water, the nuclear core comprising fissile material; a condenser disposed outside the containment structure, the condenser including a condenser inlet line tapping off a steam line connected to the internal steam generator and a condensate injection line conveying condensate from the condenser to the integral steam generator; and isolation valves outside the containment structure on a feedwater line, on the steam line, and on the condensate injection line. The valves have: (1) an operating configuration in which the isolation valves on the feedwater line and on the steam line are open and the isolation valve on the condensate injection line is closed; and (2) a heat removal configuration in which the isolation valves on the feedwater line and on the steam line are closed and the isolation valve on the condensate injection line is open.

In another embodiment, a system comprises: a containment structure; a nuclear reactor disposed in the containment structure, the nuclear reactor including an internal steam generator and a nuclear core comprising fissile material disposed in a pressure vessel; a steam line connecting with the internal steam generator; a feedwater line connecting with the internal steam generator; and a condenser disposed outside the containment structure, the condenser inlet being in valved connection with the steam line, the condenser outlet being in valved connection with the steam generator by a line other than the steam line and other than the feedwater line. In some embodiments the system includes valves having a first configuration in which the internal steam generator is operatively connected with a turbine via the steam line and a second configuration in which a closed loop is formed between the steam generator and the condenser.

In accordance with another aspect, a method comprises: driving a turbine using an internal steam generator disposed in an integral pressurized water reactor (integral PWR); and, isolating the internal steam generator from the turbine by closing feedwater and steam lines to the internal steam generator and also opening lines connecting the steam line and the steam generator with an auxiliary condenser to form a closed loop between the internal steam generator with the auxiliary condenser

BRIEF DESCRIPTION OF THE DRAWINGS

The following is a brief description of the drawings, which are presented for the purposes of illustrating exemplary embodiments disclosed herein and not for the purposes of limiting the same.

FIGS. 3-5 show side, perspective, and top views, respectively of an auxiliary condenser of the CNX.

DETAILED DESCRIPTION

Disclosed herein is an "auxiliary" condenser system (CNX) that is designed to provide passive auxiliary heat sinking in abnormal events such as station blackout or a loss of heat sinking event in which the primary coolant remains contained inside the pressure vessel. The CNX leverages an internal steam generator located inside the pressure vessel (that is, the CNX operates in conjunction with the steam generator of an integral PWR) to provide auxiliary heat sinking that employs only secondary coolant (not primary coolant). The CNX is a closed-loop system that utilizes secondary coolant water remaining in the internal steam generator after the feedwater and steam lines have been valved off. (Shutting off the feedwater and steam lines is a routine part of most abnormal response protocols, and is done in order to isolate the nuclear island from the turbine island and from any external water sources). In this way, an abnormal event such as station blackout or loss of heat sinking that does not initially involve any release of primary coolant into the containment structure may be remediated without venting primary coolant into containment.

In some embodiments, the CNX rejects heat into a thermal sink other than the ultimate heat sink (UHS) pool. For example, in illustrative embodiments the CNX includes an air-cooled condenser that rejects heat into the air. In these embodiments the CNX does not deplete the thermal capacity of the UHS pool, and accordingly does not adversely impact operation of the emergency core cooling system (ECC).

In some embodiments, the CNX is designed to remove heat in a controlled fashion so that the primary coolant water in the pressure vessel is kept in a designed temperature window. In these embodiments, by aligning the designed temperature window with a temperature at which natural circulation of primary coolant inside the pressure vessel operates efficiently, the CNX can operate as an auxiliary heat removal system without any adverse effects to the operation of the ECC system. The CNX continues to operate even if the primary coolant water temperature in the pressure vessel exceeds the designed temperature window, so as to continue to provide heat removal in this eventuality.

Figure 1:
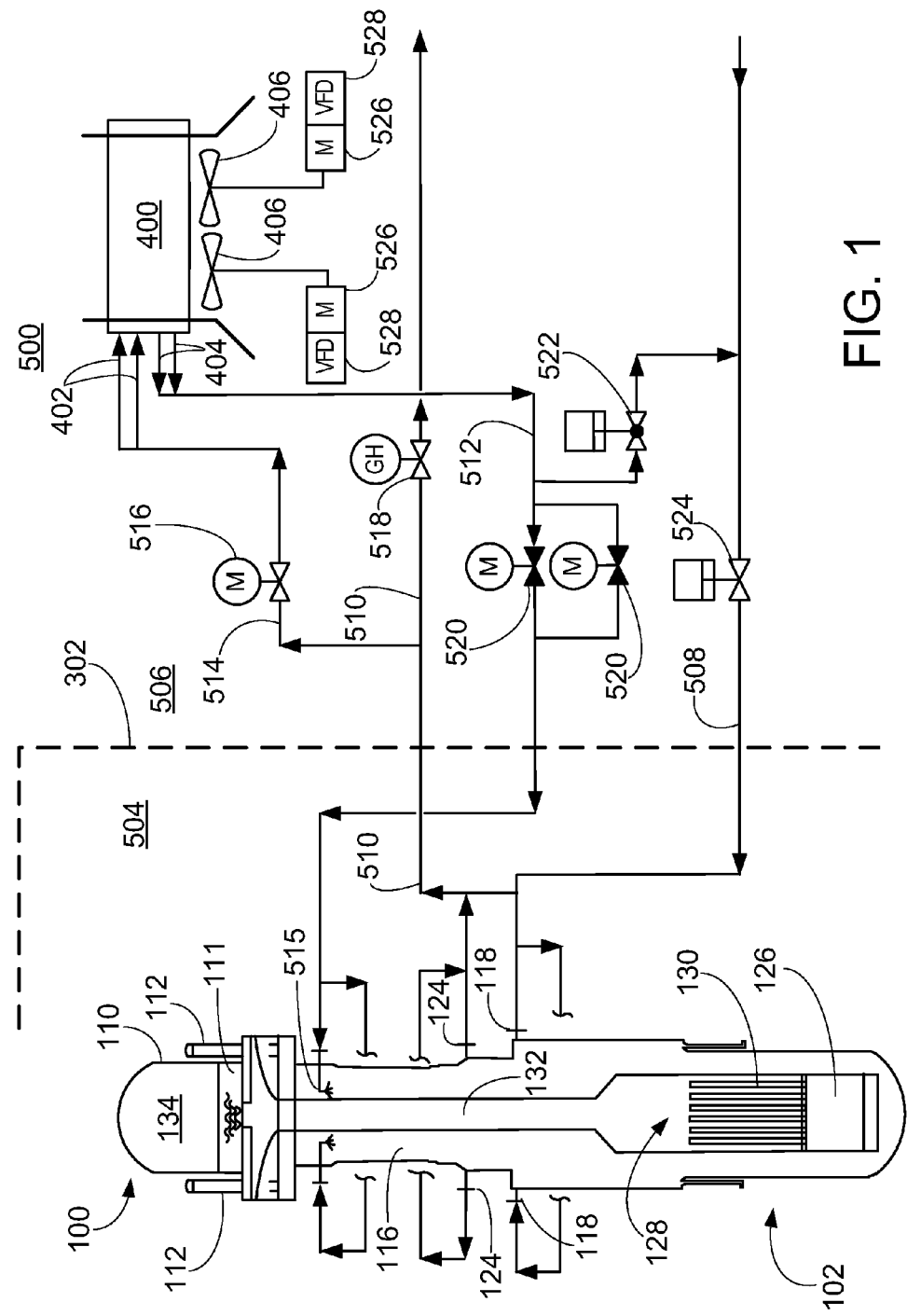
FIG. 1 diagrammatically shows a nuclear reactor and an auxiliary condenser system (CNX) in the normal operating state of the nuclear reactor in which an internal steam generator of the nuclear reactor drives a turbine.

Turning now to FIG. 1, an illustrative small modular reactor (SMR) 100 is shown, which is of the pressurized water reactor (PWR) variety. The SMR unit 100 comprises a cylindrical pressure vessel 102. The illustrative PWR 100 has an integral pressurizer 110 at top, and during normal operation the pressure vessel 102 contains primary coolant water 111 in a subcooled state with a steam bubble 134 in the pressurizer 110. Pressure control devices such as heaters and spargers (not shown) enable heating or cooling of the steam bubble 134 in the pressurizer 110 to adjust reactor pressure. In alternative embodiments, the integral pressurizer 110 is replaced by an external pressurizer connected with the pressure vessel via suitable piping. To maintain circulation during operation of the SMR unit 100, a plurality of reactor coolant pumps (RCPs) include motors 112 that drive impellers (not shown). The illustrative RCPs are located around the pressurizer 110; however, other placements of the RCPs are also contemplated, and furthermore in other embodiments the RCPs are wholly internal to the pressure vessel while in still other embodiments RCPs are omitted entirely (in which case the reactor operates by natural circulation).

With continuing reference to FIG. 1, which shows the pressure vessel 102 diagrammatically to reveal internal components, the pressure vessel 102 contains integral steam generators 116 disposed inside the upper portion of the pressure vessel 102. Thus, the PWR 100 is an integral PWR with an internal steam generator 116. The integral steam generator 116 may be, for example, a once-through straight tube types with internal economizers (some embodiments of which are described in U.S. Pub. No. 2012/0076254 A1 which is incorporated herein by reference in its entirety), although helical steam generators (some embodiments of which are described in U.S. Pub. No. 2010/0316181 A1 which is incorporated herein by reference in its entirety) or other types of internal steam generators are also contemplated. Feedwater (secondary coolant) enters the reactor 100 via a feedwater inlet 118, flows through tubes in the steam generator 116 where heat from primary coolant heats the secondary coolant to convert it to steam. The steam exits the reactor 100 via a steam outlet 124 to drive a turbine (not shown) or perform some other useful task.

The SMR unit 100 of FIG. 1 further diagrammatically indicates a nuclear reactor core 126 in the lower portion of the pressure vessel 102, and internal control rod drive mechanisms (CRDMs) 128 and associated guide frame supports 130 also disposed inside the pressure vessel 102. The reactor core 126 comprises fissile material (e.g., $^{235}$U) immersed in the primary coolant 111, e.g., water. The internal CRDMs 128 control insertion of control rods (not shown) to control reactivity; however, the reactor 100 can alternatively employ external CRDMs. Whether internal or external, the CRDMs include grey rods providing continuously adjustable reactivity control, and shutdown rods that can be dropped (i.e. scrammed) to fall into the reactor core 126 to rapidly quench the nuclear chain reaction (although decay heat from short half-life intermediate products continues to be generated after the scram). In some embodiments, both gray rod and shutdown rod functionality are integrated into the same CRDM, for example by using a separable ball-nut or a separate latch (CRDMs including separate scram latches are described, for example, in U.S. Pub. No. 2010/0316177 A1 and U.S. Pub. No. 2011/0222640 A1, both of which are incorporated herein by reference in their entireties). The guide frame supports 130 guide the translating control rod assembly into the core 126. Although not shown in the illustration of FIG. 1, a typical control rod assembly includes a set of control rods comprising neutron absorbing material yoked together by a spider and connected via a connecting rod with the CRDMs. In the illustrative PWR 100, a cylindrical central riser 132 is disposed coaxially inside the pressure vessel 102 (which is cylindrical in the illustrative embodiment of FIG. 1) and a downcomer annulus is defined between the central riser 132 and the pressure vessel 102. The steam generator 116 is disposed in this downcomer annulus. The primary coolant circuit in the illustrative reactor 100 flows upward from the nuclear reactor core 126, upward through the central riser 132, and back downward through the steam generator 116 disposed in the downcomer annulus to return to the bottom of the reactor core 126. In the illustrative reactor 100 this primary coolant flow is driven or assisted by the RCPs 112; alternatively, natural circulation driven by heat generated by the reactor core 126 can drive the primary coolant circulation.

Figure 2:
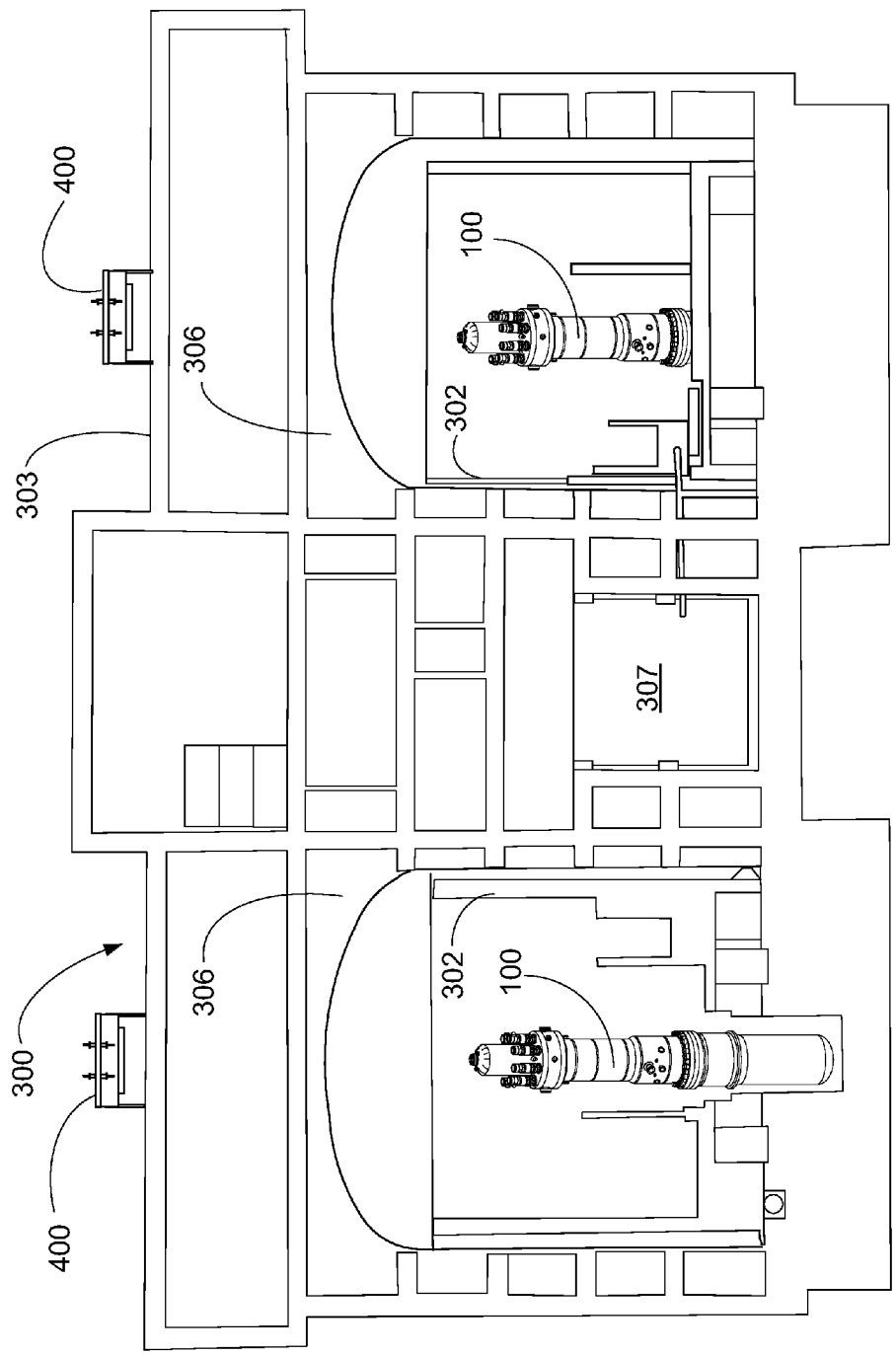
FIG. 2 diagrammatically shows a nuclear island including two nuclear reactors of the type shown in FIG. 1.

FIG. 2 shows a sectional view of a portion of a nuclear facility 300 including two such SMR units 100 (i.e., a "two-pack") each disposed in its own primary containment structure 302 (also diagrammatically indicated in FIG. 1) which are in turn disposed in a reactor service building having a roof, or other secondary structure. The illustrative plant employs a subterranean configuration, but partially or wholly above-ground plant configurations are also contemplated. The containment structure 302 contains the SMR unit 100 so as to prevent any radioactive primary coolant steam from escaping into the outside environment. The containment structure 302 is suitably constructed of a concrete or steel-reinforced concrete structure, although other building materials may be used. An ultimate heat sink (UHS) 306 is, in the illustrative embodiment, disposed above the containment structure 302 and in the illustrative embodiment is in thermal contact with the structure 302, for example, via a floor of the UHS 306 that is also the roof or top of the containment structure 302. Alternatively, the UHS can be a pond, lake, ocean, or other body of water, or a flowing stream (that does not run dry), a cooling tower, or other heat sink of suitably large capacity to dissipate heat from the reactor 100 (or two reactors 100, in the two-pack of FIG. 2) in credible accident scenarios. The illustrative nuclear reactor facility also includes a spent fuel tank 307 that serves both reactors 100.

With continuing reference to FIG. 2 and with further reference to FIGS. 3-5, the illustrative nuclear island 300 further includes auxiliary condensers 400 located at ground level above the subterranean containment structures 302. FIGS. 3, 4, and 5 show side, perspective, and top views, respectively, of one auxiliary condenser 400. The auxiliary condenser 400 is, in the illustrative embodiment, implemented as an air-cooled condenser having steam inlets 402 and condensate outlets 404. A plurality of condenser tubes 408 are arranged respective to one or more motor-driven fans 406 such that the fan or fans 406 operate to cool the condenser tubes 408 so that steam or a two-phase liquid/steam mixture received from the SMR unit 100 is condensed to form liquid water (i.e., condensate) that is returned to the SMR unit 100 via the condensate outlets 404. The condenser tubes 408 may be u-shaped or have other geometries. Although the illustrative auxiliary condenser 400 is an air-cooled condenser, the auxiliary condenser may be water-cooled (e.g., a heat exchanger disposed in a or connected with a water source) or so forth. The air-cooled auxiliary condenser 400 advantageously expels heat into the air, rather than into the UHS 306, so that the latter is not depleted and is available to dissipate heat output by other systems such as the emergency core cooling system (ECC) or, in the case of the illustrative UHS 306 which is in direct contact with containment 302, to dissipate heat output directly from containment into the UHS 306.

In some embodiments, the cooling fans 406 of the auxiliary condenser 400 are electrically powered by batteries, diesel generators, and/or (an)other self-contained power supply or supplies (not shown). In some embodiments, the self-contained power supply may be configured to maintain operation of the auxiliary condenser 400 for 8-10 hours until external power need be applied. It will be appreciated that such a time frame allows for restoration of normal SMR unit 100 support systems and functions such that a successful restart or shutdown can be accomplished. During said restoration of normal SMR unit 100 support system and functions the CNX handles the decay heat removal necessary to maintain the temperature of the reactor core 126 at a suitable temperature, and the like, for many credible abnormal events such as typical loss of heat sink or station blackout events. If the SMR unit has not yet been restarted and the self contained power supply has been extinguished, then decay heat removal continues for periods greater than 8-10 hours, i.e., a matter of days, utilizing the natural air circulation across the tubes of the condenser, e.g., chimney, draft-driven, etc. Even in such longer-term events, operation of the CNX during the first 8-10 hours assists or completely provides heat removal during the initial period of the exponentially decaying heat output over which the decay heat output is greatest. This reduces the time-integrated load on the UHS 306, extending its useful operating life in the event of a longer-term event.

Figure 6:
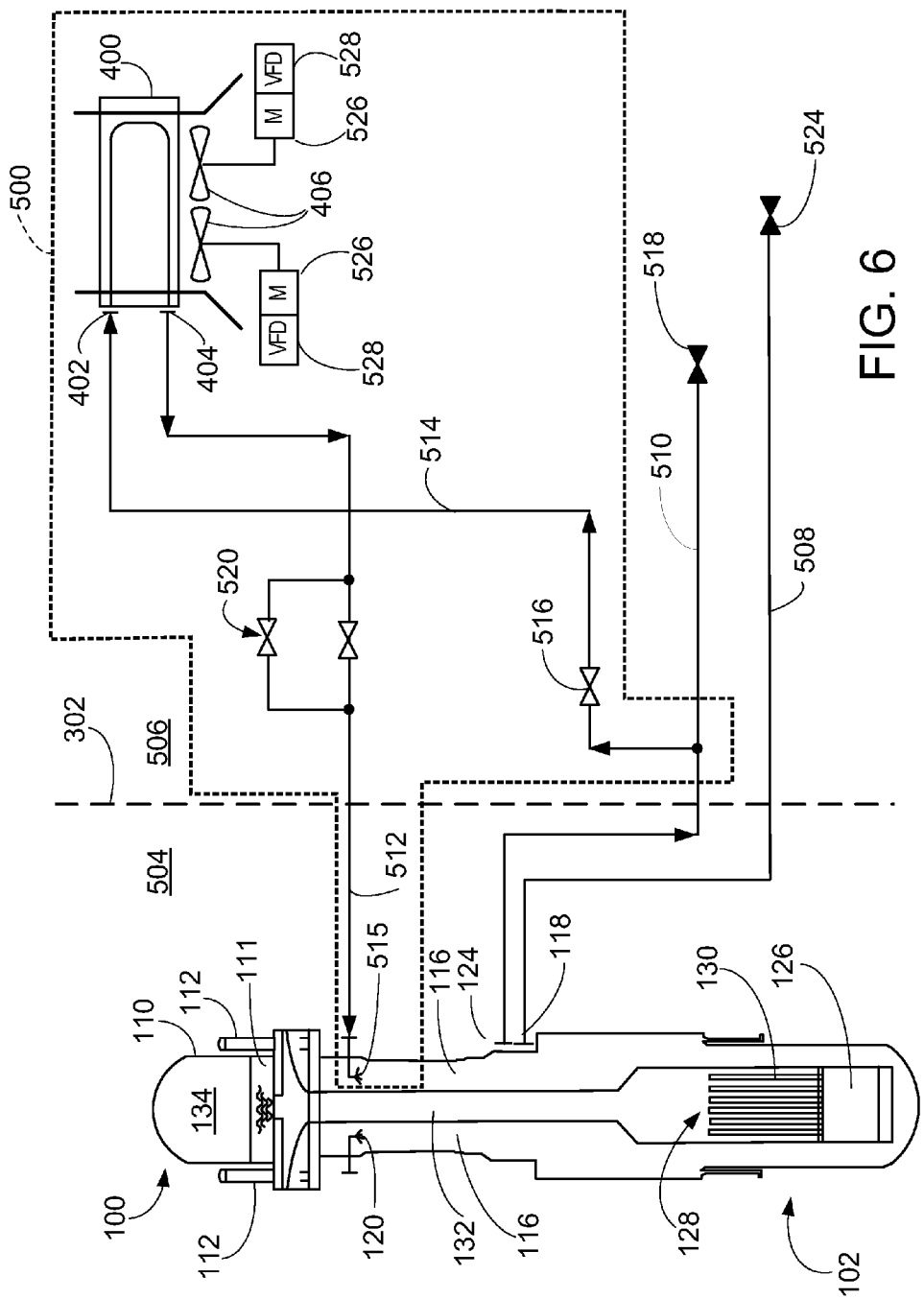
FIG. 6 diagrammatically shows the nuclear reactor and CNX of FIG. 1 in a heat removal operating state in which the CNX is in closed loop connection with the internal steam generator to remove heat from the nuclear reactor.

With reference back to FIG. 1 and with further reference to FIG. 6, the auxiliary condenser system 500 (i.e. CNX 500, of which the condenser 400 of FIGS. 3-5 is a principal component) is described. In FIG. 1, the valves are shown in their normal operating setting, while FIG. 6 diagrammatically shows a simplified representation of the principal CNX components which are also shown in FIG. 1 when the valves are set for CNX operation. In diagrammatic FIGS. 1 and 6, the containment structure 302 is indicated diagrammatically by a line separating the inside 504 of the containment structure 302 (that is, the volume "inside containment" 504) from outside 506 the containment structure 302 (that is, the volume "outside containment" 506). The CNX system 500 includes the air-cooled auxiliary condenser 400 located outside the containment structure 302 (i.e., outside containment 506), for example on the roof 303 of the reactor service building in the illustrative nuclear island 300 shown in FIG. 2. As diagrammatically shown in FIGS. 1 and 6, the SMR unit 100 is located inside the containment structure 302 (i.e. inside containment 504), and the steam generator 116 inside the pressure vessel 102 is fed by secondary coolant water (i.e. feedwater) via a feedwater inlet line 508 passing into the containment 302 and connecting with the feedwater inlets 118 on the pressure vessel 102, and delivers secondary coolant output by the steam outlets 124 of the pressure vessel 102 in the form of steam to a steam outlet line 510 that passes out of containment 302. The CNX 500 is connected with the secondary coolant circuit by a condensate injection line 512 that delivers condensate into the steam generator 116, and by a condenser inlet line 514 tapped off the steam line 510 at a point outside containment 506. Thus, the only modifications made to the secondary coolant circuit in order to add in the CNX 500 is adding a "T" connection to the steam line 510 and adding an additional input 515 into the steam generator 116. The additional input 515 is used rather than using the feedwater inlet line 508 because the condensate is preferably injected into the steam generator 116 at a relatively high point so that the heat transfer from the secondary to the primary side of the steam generator 116 helps to induce natural circulation on the primary side. The outlets 404 of the auxiliary condenser 400 feed into the condensate injection line 512 leading back to the secondary side of the steam generator 116 of the SMR unit 100, while the condenser inlet line 514 feeds into the inlets 402 of the auxiliary condenser 400. Containment isolation is provided by a containment isolation valve 516 on the condenser inlet line 514 and one (or, in the illustrative embodiment, two redundant, parallel) containment isolation valves 520 on the condensate injection line 512. These isolation valves 516 and 520 are located outside containment 506, as shown in FIG. 6. In a suitable embodiment, these isolation valves 516, 520 provide ASME Section III Class 2 containment isolation for the condenser inlet and condensate injection lines 514 and 512.

With particular reference to FIG. 1, the valve settings during normal operation of the SMR unit 100 are shown. A feedwater isolation valve 524 and a main steam isolation valve 518 (both located outside containment 506) are open to enable normal operation of the internal steam generator 116, which provides normal heatsinking for the SMR unit 100. The containment isolation valve 516 on the condenser inlet line 514 is also open, but the (illustrated redundant) containment isolation valves 520 on the condensate injection line 512 are closed to prevent operation of the auxiliary condenser 400, i.e., to prevent injection of condensate into the steam generator 116. To keep the auxiliary condenser 400 in a "hot" standby state, the isolation valve 516 is open during normal operation to feed hot steam from the steam generator 116 to the auxiliary condenser 400, and a temperature controlled bleed valve 522 is open to allow a small flow of condensate from the condensate injection line 512 to the feedwater line 508.

During normal operation, feedwater (i.e., secondary coolant) is fed from an external supply (e.g., cooling tower, water source, etc.) through the feedwater line 508 into the steam generator 116 of the SMR unit 100. The feedwater passes through the steam generator 116, being heated by the primary coolant flowing downward through the steam generator 116 to transition into steam. (Note that the primary coolant and secondary coolant flow through separate, mutually isolated paths in the steam generator 116. For example, in a tube-inside-shell steam generator design, the primary coolant may flow down through tubes of the steam generator 116 while secondary coolant flows upward "shell-side" along the outsides of the tubes. See, e.g. U.S. Pub. No. 2012/0076254 A1 which is incorporated herein by reference in its entirety). The steam exits the SMR unit 100 via the steam outlet 124 into the main steam line 510.

With reference to FIG. 6, the valve settings during CNX operation 500 are shown. In the event of a station blackout or loss of feedwater event which causes a shutdown of the SMR unit 100, the control rods are scrammed to quench the nuclear chain reaction and the steam and feedwater valves 518, 524 are closed to isolate the nuclear island. Closure of the valves 518, 524 isolates the secondary coolant circuit and also stops heat sinking via normal operation of the steam generator 116. In conjunction with closure of the valves 518, 524, the condensate isolation valves 520 are opened to initiate operation of the CNX 500. Motors 526 of the auxiliary condenser 400 are turned on to provide forced air flow via the fans 406. (The bleed valve 522, not shown in FIG. 6, is also preferably closed.) The containment isolation valve 516 on the condenser inlet line 514 remains open (recall that valve 516 is open during normal plant operation to maintain the auxiliary condenser 400 in a hot standby state). Thus, the opening of the normally closed condensate isolation valves 520 completes the CNX circuit, and allows steam from the steam generator 116 to flow into the auxiliary condenser 400 via the condenser inlet line 514 and allows the condensate from the condenser 400 to be injected back into the internal steam generator 116 via the condensate injection line 512 and the additional input 515 into the steam generator 116. The working fluid for operation of the CNX 500 is the remaining secondary coolant that remains in the steam generator 116, in the condenser inlet and injection lines 514, 512, in the condenser 400, and in the secondary circuit lines 508, 510 up to the shutoff valves 524, 518. Since the steam generator 116 and lines 508, 510 are normally completely filled at secondary coolant pressure with water or steam, the amount of working fluid for CNX operation is substantial in spite of the closure of the shutoff valves 518, 524. The CNX 500 in its working state (that is, with the valve setting shown in FIG. 6) is a closed-loop system that operates using only secondary coolant (not primary coolant) and rejects heat acquired from the internal steam generator 116 to the air above the roof 303 of the reactor service building. The CNX 500 leverages the built-in internal steam generator 116 which is designed to efficiently extract heat from the primary coolant in pressure vessel 102 (FIG. 1) without venting primary coolant from the pressure vessel 102.

The CNX 500 may operate as the sole heat removal system, or may operate in parallel with a ECC or other heat removal system. In the latter case, it is useful to ensure that the temperature of the primary coolant remains such that natural circulation remains efficient.

Figure 7:
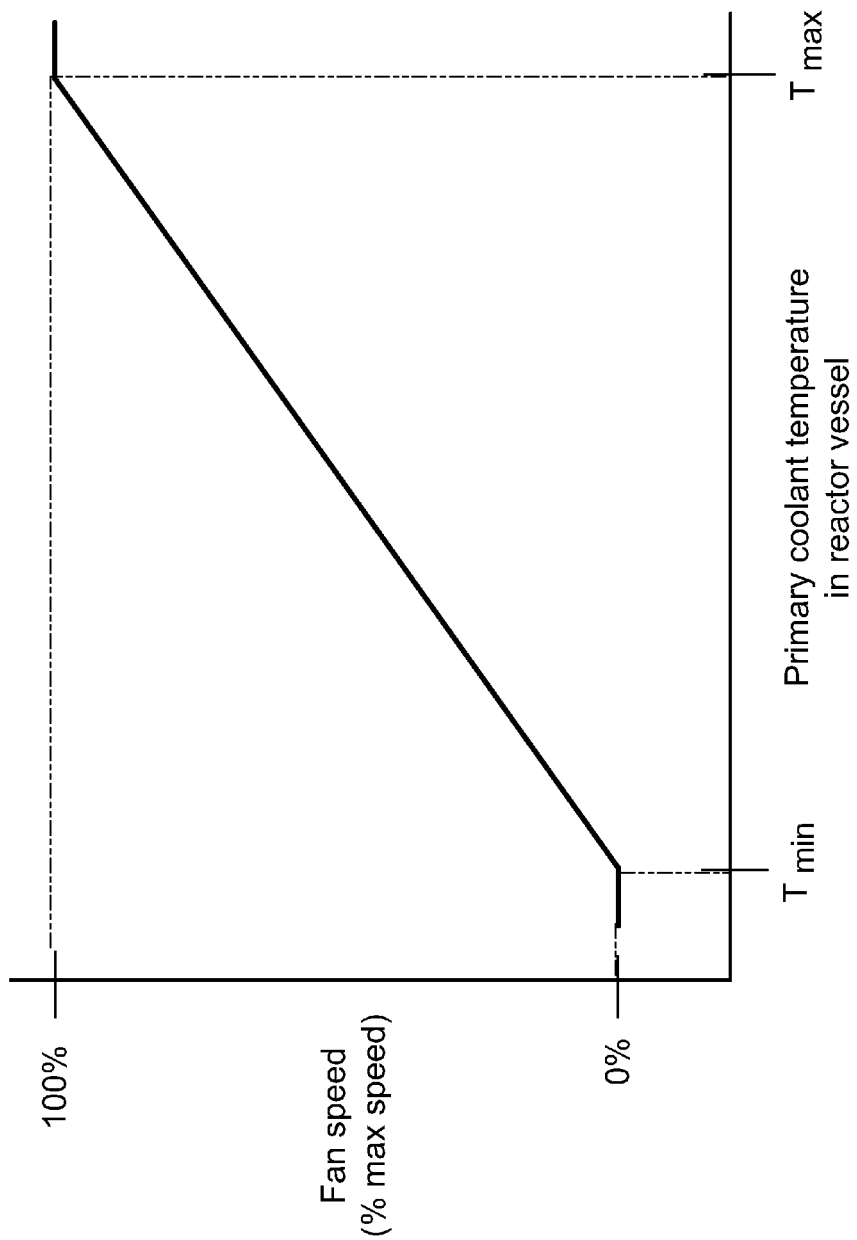
FIG. 7 diagrammatically shows an operating curve for the auxiliary condenser in which fan speed is controlled based on primary coolant temperature.

With continuing reference to FIGS. 1 and 6 and with further reference to FIG. 7, toward this end in some embodiments the CNX 500 is designed to maintain a desired primary coolant temperature window. In the illustrative embodiment, the fans 406 of the auxiliary condenser 400 are driven by one or more motors 526 operatively coupled to variable frequency drive (VFD) units 528 that can operate the fans 406 at any speed between 0% (i.e. fans off) and 100% (i.e. fans rotating at maximum speed). The VFD units 528 are configured (e.g. include or are controlled by a suitably programmed electronic control unit) to operate the motors 526 to drive the fans 406 at a speed based on the primary coolant temperature. As diagrammatically shown in FIG. 7, the fan speed is 0% (fans off) at primary coolant temperature below a minimum temperature $T_{min}$ (in one illustrative example, $T_{min}=560°$ F.), and increases linearly to 100% (fan speed maximum) as the primary coolant temperature increases up to $T_{max}$ (in one illustrative example, $T_{max}=570°$ F.). For primary coolant temperature below $T_{min}$ the fans remain off (0%), while for temperatures above $T_{max}$ the fans operate at maximum speed (100%). The primary coolant temperature may be measured inside the pressure vessel 102, or alternatively a "surrogate" primary coolant temperature may be measured elsewhere. In this way, the primary coolant temperature is kept in the temperature window [$T_{min}$, $T_{max}$], e.g. between 560 degrees Fahrenheit and 570 degrees Fahrenheit in the illustrative example. If the CNX 500 is unable to keep the temperature below $T_{max}$ it still continues to operate at 100%. If the temperature falls below $T_{min}$ the CNX 500 is turned "almost" off. ("Almost" because some heat is still rejected to the air by the auxiliary condenser 400 even with the fans 406 off via radiative heat transfer and natural air convection). Alternative, in some embodiments $T_{max}$ may be measured on the secondary side, for example by measuring the temperature of the secondary coolant entering the inlets 402 of the auxiliary condenser 400.

Although FIG. 7 shows a linear fan speed-primary coolant temperature curve between $T_{min}$ and $T_{max}$, other response curves are contemplated, such as a piece-wise stepped response curve (e.g., suitable for drive units that do not provide continuous speed control). A binary operation is also contemplated, e.g. 0% speed below a temperature threshold and 100% speed above the temperature threshold. Moreover, while the temperature control approach described with reference to FIG. 7 is advantageous, it is also contemplated to employ a constant (e.g., maximum) fan speed whenever the CNX 500 is in operation, so as to provide maximum heat removal whenever the CNX is running.

With suitable design capacity, it is anticipated that the CNX 500 can remediate a non-LOCA abnormal event (that is, an abnormal event that does not initially involve venting of primary coolant into containment) without requiring intentional primary coolant venting. Toward this end, the auxiliary condenser 400 should be designed with sufficient thermal capacity to reject decay heat over a design period (e.g., 8-10 hours). Optionally, two or more auxiliary condensers can be connected with the lines 512, 514 (or with duplicate lines 512, 514) to provide the desired capacity. On the other hand, the CNX preferably should not "overcool" the reactor so as to extinguish primary coolant natural circulation or cause other problems such as thermal stresses. This latter objective can be achieved using temperature control as described herein with reference to FIG. 7, or by designing the auxiliary condenser 400 to have thermal capacity low enough to ensure that "overcooling" is not obtained.

The CNX is generally not intended as a safety-critical system, and a separate emergency core cooling system (ECC) is expected to be provided to remediate a LOCA or other safety-critical situation. That said, the CNX may operate in conjunction with the ECC or other safety-critical system during a LOCA or other safety-critical situation to provide supplemental heat removal. More generally, the CNX provides a mechanism for addressing abnormal events such as station blackout or loss of heat sinking in a fashion that may enable recovery without invoking the ECC or other safety critical system(s).

While not the primary function, it is also contemplated to employ the CNX during routine reactor shut down operations, e.g. preparatory to reactor refueling. For example, employing the CNX for routine reactor shutdown may enable the main turbine condenser and feedwater system to be taken off-line earlier than would otherwise be possible so that maintenance can begin on these and other systems that are isolated by closure of the shutoff valves 518, 524.

The present disclosure has been illustrated and described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

What is claimed is:

1. A system comprising:
   a nuclear reactor disposed in a containment structure, the nuclear reactor including an internal steam generator and a nuclear core immersed in primary coolant water, the nuclear core comprising fissile material;
   a steam line connected to an outlet of the steam generator and passing through the containment structure to convey steam from the internal steam generator;
   a feedwater line connected to a first inlet of the steam generator and passing through the containment structure to convey feedwater into the internal steam generator;
   a condenser disposed outside the containment structure;
   a condenser inlet line tapping off the steam line at a point outside the containment structure and feeding into an inlet of the condenser; and
   a condensate injection line conveying condensate from an outlet of the condenser into a second inlet of the steam generator,
   wherein the first inlet of the steam generator is independent of the second inlet of the steam generator.

2. The system of claim 1 further comprising a valve on the condensate injection line and isolation valves outside the containment structure on the feedwater line and on the steam line, wherein the valves have:
   an operating configuration in which the isolation valves on the feedwater line and on the steam line are open and the isolation valve on the condensate injection line is closed, and
   a heat removal configuration in which the isolation valves on the feedwater line and on the steam line are closed and the isolation valve on the condensate injection line is open.

3. The system of claim 2, further comprising a bleed valve connecting the condensate injection line with the feedwater line, the bleed valve being open in the operating configuration to keep the condenser in a hot standby state and closed in the heat removal configuration.

4. The system of claim 2, wherein the condenser is an air-cooled condenser.

5. The system of claim 4, wherein the air-cooled condenser includes a fan and a speed control drive that controls fan speed in the heat removal configuration based on primary coolant temperature.

6. The system of claim 5, wherein the speed control drive controls fan speed to turn the fan off when the primary coolant temperature is below a minimum temperature.

7. The system of claim 6, wherein the speed control drive controls fan speed to operate at maximum fan speed when the primary coolant temperature is above a maximum temperature.

8. The system of claim 7, wherein the maximum temperature is greater than the minimum temperature.

9. The system of claim 1, wherein the condenser is an air-cooled condenser that is cooled by at least one fan.

10. The system of claim 7, wherein the condensate injection line injects the condensate back to the internal steam generator at an elevated point.

* * * * *